US006898644B1

(12) United States Patent
Perez

(10) Patent No.: US 6,898,644 B1
(45) Date of Patent: May 24, 2005

(54) METHOD OF PROGRAMMING I/O ADAPTER SETTINGS FOR OPTIMAL PERFORMANCE

(75) Inventor: Michael Anthony Perez, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 639 days.

(21) Appl. No.: 09/645,173

(22) Filed: Aug. 24, 2000

(51) Int. Cl.[7] .............................. G06F 3/00; H02H 3/05
(52) U.S. Cl. .............................. 710/10; 710/8; 710/33; 702/182; 714/1; 714/25; 714/37
(58) Field of Search .............................. 710/8, 10, 33, 710/1, 62, 72, 18, 36, 60; 714/1, 25, 37; 702/182

(56) References Cited

U.S. PATENT DOCUMENTS

| 5,394,322 A | * | 2/1995 | Hansen ........................ 700/37 |
| 5,537,607 A | * | 7/1996 | Ploger, III ................... 710/10 |
| 5,579,529 A | * | 11/1996 | Terrell et al. ................. 710/8 |
| 5,659,794 A | * | 8/1997 | Caldarale et al. ............... 710/1 |
| 5,689,726 A | * | 11/1997 | Lin ............................. 710/10 |
| 6,003,097 A | * | 12/1999 | Richman et al. ............... 710/8 |
| 6,119,185 A | * | 9/2000 | Westerinen et al. ......... 710/104 |
| 6,292,764 B1 | * | 9/2001 | Avery et al. .................. 703/14 |
| 6,336,152 B1 | * | 1/2002 | Richman et al. ............... 710/8 |
| 6,381,656 B1 | * | 4/2002 | Shankman .................... 710/18 |
| 6,442,628 B1 | * | 8/2002 | Bastiani et al. ............... 710/60 |
| 6,499,073 B1 | * | 12/2002 | Wallach et al. ............. 713/340 |

* cited by examiner

Primary Examiner—Kim Huynh
Assistant Examiner—Angel L. Casiano
(74) Attorney, Agent, or Firm—Duke W. Yee; Mark E. McBurney; Wayne P. Bailey

(57) ABSTRACT

A method, system, and apparatus for programming adapter settings in a data processing system is provided. In one embodiment, the data processing system programs a plurality of settings for each of a plurality of adapters using system based parameters. The data processing system then determines whether any of the adapters settings as programmed based on system based parameters are inconsistent with the specific requirements of the specific adapter. If one or more of the settings in any adapter are inconsistent with the adapter's requirements, those settings are reprogrammed using adapter specific parameters to ensure optimal performance of the data processing system with the adapter.

3 Claims, 2 Drawing Sheets

100 DATA PROCESSING SYSTEM

METHOD OF PROGRAMMING I/O ADAPTER SETTINGS FOR OPTIMAL PERFORMANCE

BACKGROUND OF THE INVENTION

1. Technical Field

The present invention relates to an improved data processing system and, more particularly, to methods of programming input/output adapter settings within a data processing system.

2. Description of Related Art

Computers have become increasingly important to the economy of the present day world. Traditionally, computers have been utilized by scientists and engineers aid in understanding the physical world as well as to aid in developing and designing solutions to problems ranging from developing pharmaceuticals to building office buildings and bridges. However, computers are increasingly being used in business to accept and fill orders for goods and services, such as, via the Internet, as well as to aid in other services, such as accounting and banking.

With the increasing reliance upon computers and the every increasing pace of business and innovation, more demands are continually being placed on the performance of computers. One important area that impacts the performance of computers is the interface between the main processing and memory components of a computer and peripheral devices such as, for example, hard disk drives and network interfaces. These peripheral devices are connected to the main components of the computer through adapters. An adapter is a device that allows one system to connect to and work with another. An adapter is often a simple circuit that converts one set of signals to another; however, the term often refers to devices which are more accurately called "controllers." For example, display adapters (video cards), network adapters (NICs) and SCSI host adapters perform extensive processing, but they are still called "adapters."

Each adapter within a computer contains settings that must be programmed by the computer in order for the device connected to the adapter to communicate with the rest of the computer. The traditional methodology used to program adapter settings is that a series of adapters, such as PCI adapters typically are setup using system based settings. For example, PCI-based devices require their latency timer, cache line size, as well as other parameters to be initialized based on the requirements of the computer. If a computer's cache line size is 32B, then the adapter is programmed to 32B. If the computer's cache line size is 64B, then the appropriate parameters within the adapters settings are programmed to 64B.

The problem with this approach is that some devices do not function well using system based settings. For example some FC-AL adapters have problems when programmed with the system setting of 128 cache line size. With that setting, the adapter is only able to perform 0.25 MB/sec and had numerous AIX error log entries for timeout errors. However, changing the value to 64B, increased the performance by 36000% to 90 MB/sec. Therefore, a method of programming adapter settings in a manner that optimizes the performance of the adapter with the computer would be desirable.

SUMMARY OF THE INVENTION

The present invention provides a method, system, and apparatus for programming adapter settings in a data processing system. In one embodiment, the data processing system programs a plurality of settings for each of a plurality of adapters using system based parameters. The data processing system then determines whether any of the adapters settings as programmed based on system based parameters are inconsistent with the specific requirements of the specific adapter. If one or more of the settings in any adapter are inconsistent with the adapter's requirements, those settings are reprogrammed using adapter specific parameters to ensure optimal performance of the data processing system with the adapter.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
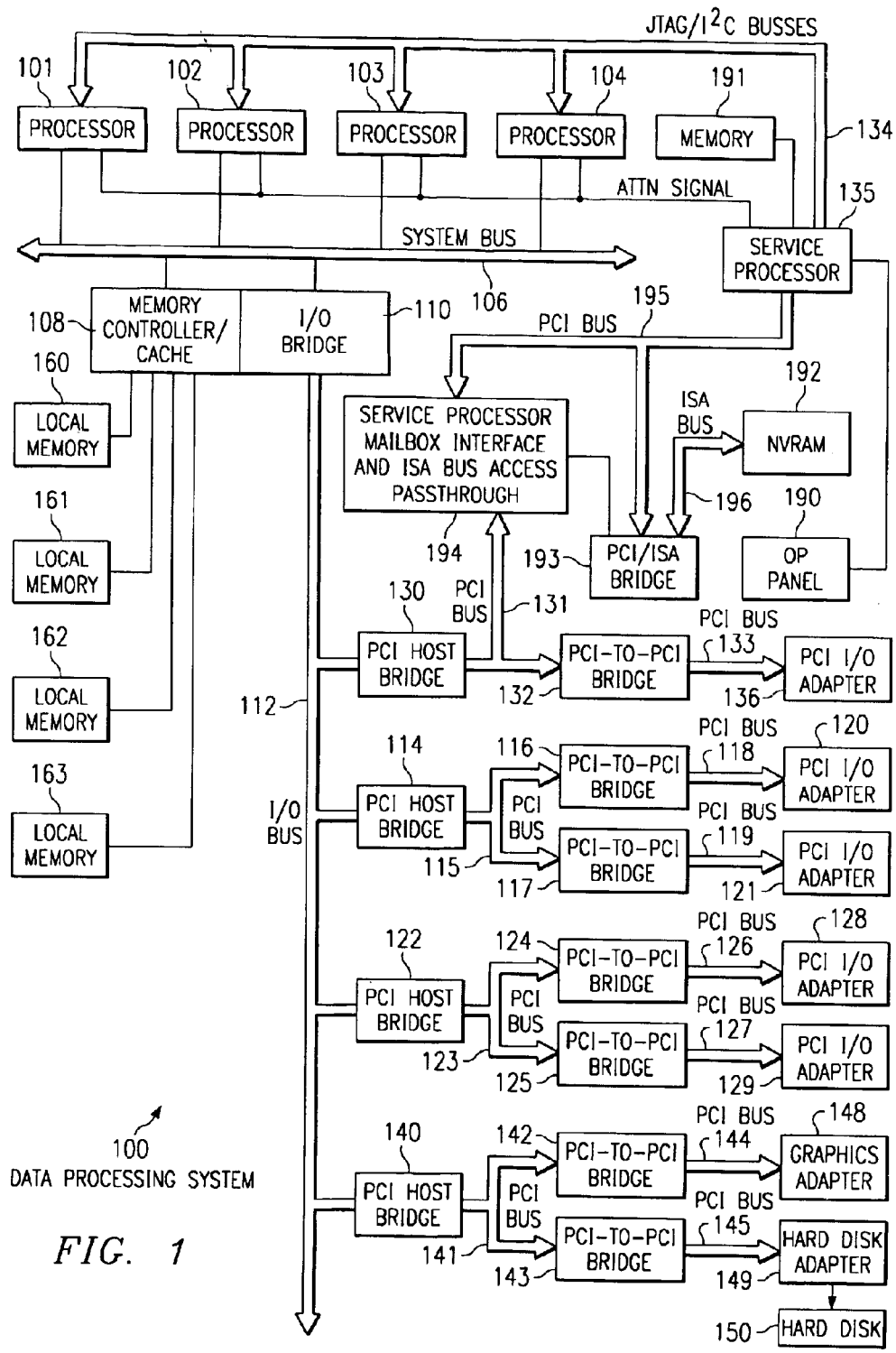
FIG. 1 depicts a block diagram of a data processing system in which the present invention may be implemented.

With reference now to the figures and, in particular, with reference to FIG. 1, a block diagram of a data processing system in which the present invention may be implemented is depicted. Data processing system 100 is an example of a server. Data processing system 100 may be a symmetric multiprocessor (SMP) system including a plurality of processors 101, 102, 103, and 104 connected to system bus 106. For example, data processing system 100 may be an IBM RS/6000, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160–163. I/O bus bridge 110 is connected to system bus 106 and provides an interface to I/O bus 112. Memory controller/cache 108 and I/O bus bridge 110 may be integrated as depicted. An operating system, such as, for example, the Advanced Interactive Executive (AIX) operating system, a product of the International Business Machines Corporation of Armonk, N.Y., may run on data processing system 100.

Peripheral component interconnect (PCI) Host bridge 114 connected to I/O bus 112 provides an interface to PCI local bus 115. A number of Input/Output adapters 120–121 may be connected to PCI bus 115 through a respective one of PCI-to-PCI bridges 116–117 via a respective one of PCI buses 118–119. Typical PCI bus implementations will support between four and eight I/O adapters (i.e. expansion slots for add-in connectors). Each I/O Adapter 120–121 provides an interface between data processing system 100 and input/output devices such as, for example, other network computers, which are clients to data processing system 100.

An additional PCI host bridge 122 provide an interface for an additional PCI bus 123. PCI bus 123 is connected to a plurality of PCI-to-PCI bridges 124–125 which are in turn each connected to a respective one of PCI I/O adapters 128–129 by a respective one of PCI buses 126–127. Thus, additional I/O devices, such as, for example, modems or network adapters may be supported through each of PCI I/O adapters 128–129. In this manner, data processing system 100 allows connections to multiple network computers. Each of PCI-to-PCI bridges 116–117, 124–125, 142–143, and 132 is connected to a single I/O adapter.

A memory mapped graphics adapter 148 may be connected to I/O bus 112 through PCI Host Bridge 140 and PCI-to-PCI Bridge 142 via PCI buses 141 and 144 as depicted. A hard disk 150 may also be connected to I/O bus 112 through PCI Host Bridge 140 and PCI-to-PCI Bridge 142 via PCI buses 141 and 145 as depicted.

A PCI host bridge 130 provides an interface for a PCI bus 131 to connect to I/O bus 112. PCI bus 131 connects PCI host bridge 130 to the service processor mailbox interface and ISA bus access passthrough logic 194 and PCI-to-PCI Bridge 132. Input/Output adapter 136 may be connected to PCI bus 131 through PCI-to-PCI bridge 132 via PCI bus 133. The ISA bus access passthrough logic 194 forwards PCI accesses destined to the PCI/ISA bridge 193. The NV-RAM storage is connected to the ISA bus 196. The Service processor 135 is coupled to the service processor mailbox interface 194 through its local PCI bus 195.

Service processor 135 is also connected to processors 101–104 via a plurality of JTAG/I$^2$C buses 134. JTAG/I$^2$C buses 134 are a combination of JTAG/scan busses (see IEEE 1149.1) and Phillips I$^2$C busses. However, alternatively, JTAG/I$^2$C buses 134 may be replaced by only Phillips I$^2$C busses or only JTAG/scan busses. All SP-ATTN signals of the host processors 101, 102, 103, and 104 are connected together to an interrupt input signal of the service processor. The service processor 135 has its own local memory 191, and has access to the hardware op-panel 190. Service processor 135 is responsible for saving and reporting error information related to all the monitored items in data processing system 100. Service processor 135 also takes action based on the type of errors and defined thresholds.

Some or all or PCI I/O adapters 120–121, 128–129, 136, and 148–149 may be Small Computer System Interface (SCSI) and/or Serial Storage Architecture (SSA) adapters and be connected to SCSI and/or SSA devices. SSA is a peripheral interface from the International Business Machines Corporation that transfers data at a rate of up to 80 Mbytes/sec. SSA 160 increases the rate to 160 MBps. SSA's ring configuration allows remaining devices to function if one fails. SCSI software can be mapped over SSA allowing existing SCSI devices to be used. While distances of SCSI cables are measured in feet, SSA cable can be up to 25 meters over copper and 2.4 kilometers over fiber.

SCSI (pronounced "scuzzy") is a hardware interface that allows for the connection of up to seven (7) to fifteen (15) peripheral devices to a single expansion board that plugs into the computer called a "SCSI host adapter" or "SCSI controller." SCSI peripherals are daisy chained together, and all devices have a second port that is used to connect the next device in line. Single SCSI boards are also available with two controllers and support up to 30 peripherals.

Some or all or PCI I/O adapters 120–121, 128–129, 136, and 148–149 may also be implemented using FC-AL (Fibre Channel-Arbitrated Loop) technology or using IDE adapters. FC-AL is a topology for Fibre Channel in which all devices are linked together in a loop. Fibre Channel is a high-speed transmission technology that can be used as a front-end communications network, a back-end storage network, or both at the same time. Fibre Channel is a driving force in the storage area network (SAN) arena for connecting multiple hosts to dedicated storage systems. IDE (Integrated Drive Electronics) is a type of hardware interface widely used to connect hard disks, CD-ROMs and tape drives to a data processing system.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
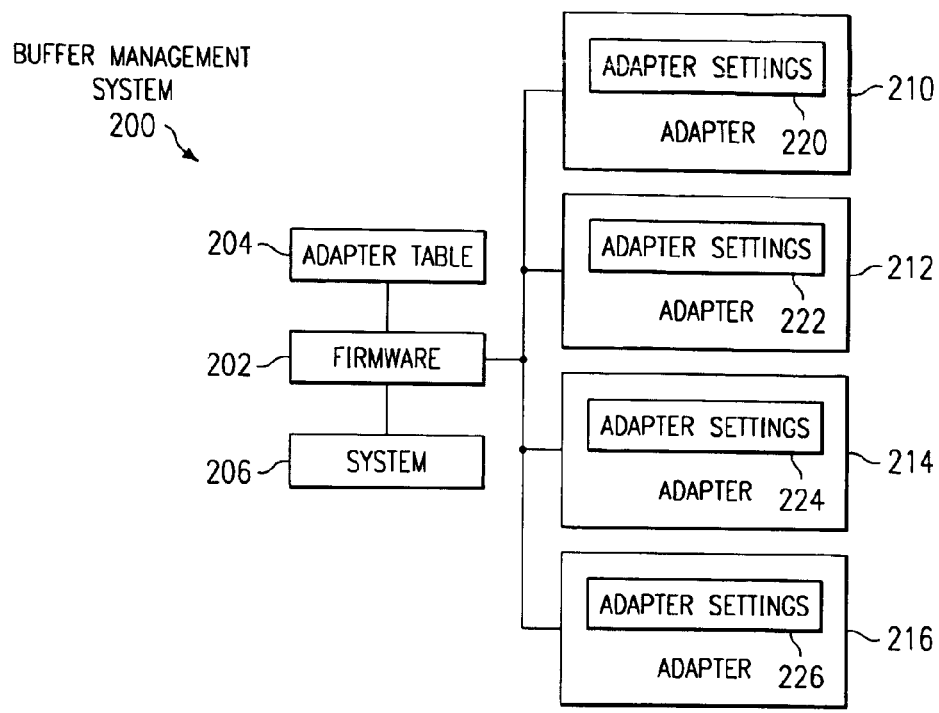
FIG. 2 depicts a block diagram illustrating an adapter buffer management system in accordance with the present invention.

With reference now to FIG. 2, a block diagram illustrating an adapter buffer management system is depicted in accordance with the present invention. Buffer management system 200 includes firmware 202, adapters 210–216, system 206, and adapter table 204. Buffer management system 200 may be implemented within a data processing system, such as, for example, data processing system 100 in FIG. 1. Instructions for executing firmware 202 may be contained in a non-volatile memory device such as, for example, NVRAM 192 in FIG. 1 and may be executed in a processor such as, for example, service processor 135 in FIG. 1. Each of adapters 210–216 contains adapter settings 220–226 that must be programmed by system 206 as well as buffering mechanisms (not shown). Each of adapters 210–216 may be implemented as, for example, one of PCI I/O adapters 120–121, 128–129, and 136 or as one of graphics adapter 148 or hard disk adapter 149 as depicted in FIG. 1. System 206 represents the remaining components of a data processing system, such as, data processing system 100 in FIG. 1.

System 206 contains information about settings for adapters 210–216 that reflect the fastest and best performing settings that system 206 is capable of handling. Firmware 202 walks through each of adapters 210–216 and configures each of adapter settings 220–226 to correspond to the most desirable settings as determined by system 206. Firmware then consults adapter table 204 and walks through adapters 210–216 once more reprogramming certain characteristics of each of adapter settings 220–226 to correspond to adapter specific requirements as obtained from adapter table 204. Adapter table 204 contains adapter requirements that have priority over system requirements when used to program adapter parameters.

By setting the adapter settings 220–226 using system settings initially, it is ensured that the adapter settings 220–226 are not set to an area exceeding the capabilities of the system 206. If the adapter settings 220–226 are determined to be incompatible with the particular adapter 210–216 after consulting adapter table 204, the adapter settings 220–226 of adapters 210–216 for which the system settings are too great are reduced such that a more optimal performance of the adapters 210–216 with the system 206 may be had.

Some adapters internal buffering mechanisms are not compatible with system parameters. For example, although the adapter parameters for system 200 may call for a cache line size of 128 bytes (B), the adapter's buffer mechanism may not be able to handle more than 64B for optimal performance. However, when reprogrammed based on the adapters individual requirements, system 206 and each of adapters 210–216 may perform at a greater throughput.

To aid in understanding the advantages of the present invention, consider the following example. In one experiment, an FC-AL adapter was programmed only with system parameters as in the prior art. The system parameters called for a cache line size of 128 B. However, with that setting, the FC-AL adapter was only able to perform at 0.25 MB/sec and had numerous AIX error log entries due to timeout errors. By utilizing the present invention and changing the setting from 128 B to 64 B, the performance was increased by 36000% to 90 MB/sec. Thus, by utilizing the present invention, much greater optimization of the data processing system's performance may be obtained over that obtained with the prior art method of programming the adapter settings.

In some other embodiments of the present invention, a device driver may execute a testcase that tests performance parameters. The firmware 202 then runs the device driver with the system specific settings. The device driver then alters the system specific settings while measuring its performance until it finds an optimal setting. The adapter is then reprogrammed with the optimal setting as determined by the device driver.

Those of ordinary skill in the art will appreciate that the hardware depicted in FIG. 2 may vary. For example, more or fewer adapters 210–216 may be used in place of the hardware depicted. The depicted example is not meant to imply architectural limitations with respect to the present invention. For example, the adapter specific requirements may be obtained from a register within the adapter, a flag passed by the adapter, or through some other software reporting mechanism rather than from adapter table 204.

Figure 3:
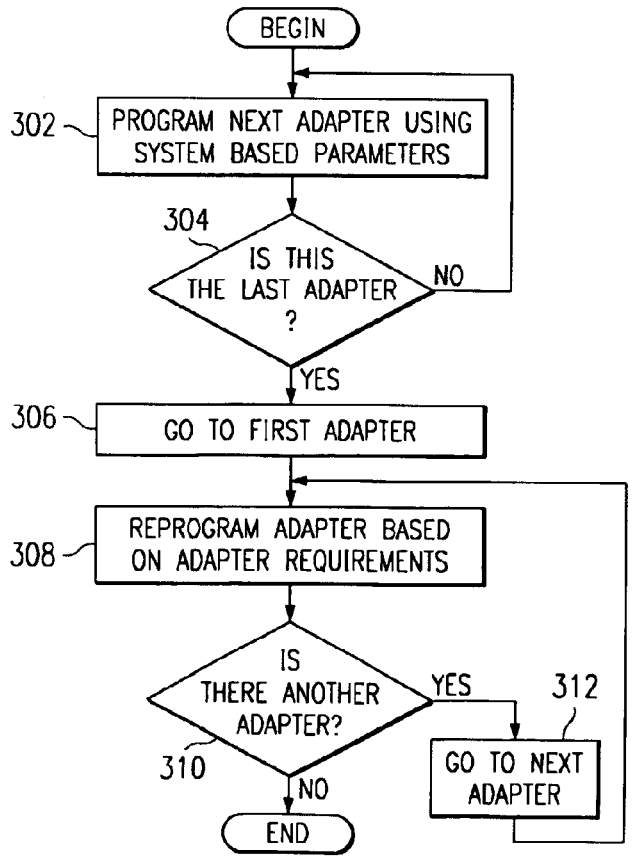
FIG. 3 depicts a flowchart illustrating an exemplary method of programming adapter settings in accordance with the present invention.

With reference now to FIG. 3, a flowchart illustrating an exemplary method of programming adapter settings is depicted in accordance with the present invention. To begin, the data processing system, through, for example, system firmware, such as, for example firmware 202 in FIG. 2, programs the first adapter's settings according to system parameters (step 302). These system settings may represent the maximal values for which the adapter may be programmed and be compatible with the requirements of the data processing system. It is next determined whether there are more adapters (step 304). If there are more adapters, then the next adapter is programmed using the system based parameters (step 302).

Once all of the adapters have been programmed with system based parameters, the firmware returns to the first adapter (step 306) and reprograms, if necessary, the first adapter based on adapter requirements as obtained, for example, from an adapter table, such as, for example, adapter table 204 in FIG. 2 (step 308). The firmware then determines whether there are more adapters (step 310) and, if so, then steps to the next adapter (step 312) and reprograms the next adapter, if necessary, based on adapter requirements (step 308).

Once each adapter has been returned to and reprogrammed, if necessary, then the process ends. It should be noted that not all adapters may need to be reprogrammed. Furthermore, it should be noted that not all parameters in adapters that are reprogrammed may need to be reprogrammed. Thus, in some embodiments of the present invention, only those parameters within adapter settings that are in conflict with adapter specific parameters are reprogrammed. Other parameters within adapter settings that have been programmed with system based parameters which are consistent with adapter specific requirements are not reprogrammed. Also, it should be noted, that although the present invention has been described primarily with reference to buffer settings for the adapters, other settings may also be reprogrammed based upon adapter specific requirements to optimize the functioning of the adapter with the data processing system.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of programming an adapter for use with a data processing system, the method comprising:

programming settings within an adapter using system based parameters;

testing performance of the adapter while varying the settings from the system based parameters until an optimal setting is determined; and reprogramming the adapter using the optimal setting.

2. A computer program product in a computer readable media for use in a data processing system for programming an adapter for use with a data processing system, the computer program product comprising:

first instructions for programming settings within an adapter using system based parameters;

second instructions for testing performance of the adapter while varying the settings from the system based parameters until an optimal setting is determined; and third instructions for reprogramming the adapter using the optimal setting.

3. A system for programming an adapter for use with a data processing system, the system comprising:

first means for programming settings within an adapter using system based parameters;

second means for testing performance of the adapter while varying the settings from the system based parameters until an optimal setting is determined; and third means for reprogramming the adapter using the optimal setting.

* * * * *